United States Patent
Farzaneh

(12) 
(10) Patent No.: US 6,266,528 B1
(45) Date of Patent: Jul. 24, 2001

(54) PERFORMANCE MONITOR FOR ANTENNA ARRAYS

(75) Inventor: Farhad Farzaneh, San Francisco, CA (US)

(73) Assignee: ArrayComm, Inc., San Jose, CA (US)

( * ) Notice: Subject to any disclaimer, the term of this patent is extended or adjusted under 35 U.S.C. 154(b) by 0 days.

(21) Appl. No.: 09/219,040

(22) Filed: Dec. 23, 1998

(51) Int. Cl.$^7$ ............................................... H04Q 7/20
(52) U.S. Cl. ................... 455/423; 455/67.1; 342/173; 342/360; 342/372
(58) Field of Search ................................ 455/423, 424, 455/272, 226.1, 226.2, 226.3, 226.4, 132, 133, 67.1, 67.3, 562, 8–10, 504–506, 67.6; 342/173, 174, 372, 373, 368, 360; 343/702, 703, 824, 835

(56) References Cited

U.S. PATENT DOCUMENTS

| | | | |
|---|---|---|---|
| 4,639,732 * | 1/1987 | Acoraci et al. | 342/371 |
| 4,926,186 * | 5/1990 | Kelly et al. | 342/360 |
| 5,867,123 * | 2/1999 | Geyh et al. | 342/173 X |
| 5,970,394 * | 10/1999 | Arpee et al. | 455/67.1 |

\* cited by examiner

Primary Examiner—Tracy Legree
(74) Attorney, Agent, or Firm—Dov Rosenfeld; Inventek

(57) ABSTRACT

An antenna monitor collects statistics about the received signal strengths of each antenna in a cooperating antenna array over long periods of time. In cellular telephone base station applications for a base station using an array of antenna elements to obtain spatial diversity, samples of the received signal strength are taken during particular times whenever an active mobile subscriber is operating in the area. Periodically, such samples are averaged and added to a running total that is maintained in a long-term accumulator for each antenna. The accumulated totals are then compared after a statistically sufficient number of samples have been collected and averaged. Faulty antennas, including broken ones and ones with bad connections, will be revealed by those corresponding signal paths having relatively low accumulated totals. Given long enough collection periods, the spatial diversity of the antennas in the array will have only a minimal impact on favoring one antenna over another.

19 Claims, 3 Drawing Sheets

PERFORMANCE MONITOR FOR ANTENNA ARRAYS

FIELD OF INVENTION

This invention relates to devices and methods for monitoring the operational condition of individual antennas in wireless communication systems, and more specifically, to detecting on-line the apparent failure of particular antennas in an array of antennas.

BACKGROUND TO THE INVENTION

Long ago radio transceivers universally operated with single antennas because the wavelengths involved were large and multiple antennas in an array were impractical. Now at the very high frequencies that are common in cellular telephone transceivers, each antenna can be quite small and arrays of antennas can be used to great advantage. Also, signal processing technology is readily available to take advantage of performance improvements possible with multiple antenna systems. This is especially true of cellular telephone base stations that need to improve the received signal strengths and/or steer the transmitted signals in particular directions to improve performance.

Systems with an array of multiple-antenna array are therefore being proposed and implemented. In some cases, the simple difference in location of one antenna over another in the same antenna array will result in a stronger, or weaker, received signal. Such spatial "diversity" is now conventionally used to improve radio system performance and reliability. The difference in received signal strengths amongst individual antennas in an otherwise seemingly closely grouped array may result from the way reflected multipath signals arrive at each one. Smart antenna systems also are being proposed which add adaptive "spatial" processing to improve performance. Each antenna contributes to a weighted combination of received signals and the combination can then be input to a spatial processor which determines optimal weights for improved performance. This can even allow for more than one "spatial" channel to exist in a conventional (frequency, time-slot, and/or code) channel. Such multiplexing is sometimes called spatial division multiple access (SDMA). For a description of smart antenna SDMA systems that can work with more than one spatial channel per conventional channel, see, for example, co-owned U.S. Pat. Nos. 5,515,378 (issued May 7, 1996) and 5,642,353 (issued Jun. 24, 1997) entitled SPATIAL DIVISION MULTIPLE ACCESS WIRELESS COMMUNICATION SYSTEMS, Roy, III, et al., inventors, and co-owned U.S. Pat. No. 5,592,490 (issued Jan. 7, 1997) entitled SPECTRALLY EFFICIENT HIGH CAPACITY WIRELESS COMMUNICATION SYSTEMS, Barratt, et al., inventors. For a smart antenna system that has only one spatial channel per conventional channel, see co-owned U.S. patent application Ser. No. 08/729,390, filed on Oct. 11, 1996, entitled METHOD AND APPARATUS FOR DECISION DIRECTED DEMODULATION USING ANTENNA ARRAYS AND SPATIAL PROCESSING, Barratt et al., inventors.

With such systems, it therefore is important for maintenance personnel to know if one or more antennas is not functioning correctly for whatever reason. One such reason is that there is some faulty hardware in the antenna or the signal path of the output of the antenna. For example, if three out of four antennas in an array are working, the fourth antenna's failure will not usually cause an operational failure of the whole transceiver that would draw attention to the problem, so a failure of one antenna could go undetected for a long time. In the meantime, the loss of one or more antennas will degrade the performance of the base station and could result in lost revenues, decreased customer satisfaction, and even wasted maintenance efforts.

In addition to some of the hardware being faulty, it is also important to detect and quantify siting efficiency for multiple antenna systems. It is desirable for the antennas to be balanced. However, for example, there may be siting situations in which one of the antennas may be "hidden," i.e., it may be in an RF shadow and so won't receive signals very well. In such a situation, all the hardware may be working correctly, but the antenna system was not placed well. This is more likely in a micro-cellular environment (like the PHS or DECT system) than in a cellular system.

The term faulty antenna will thus be understood herein to mean an antenna in which either the hardware is faulty, or which produces a low signal level because of siting inefficiency.

SUMMARY

An object of the present invention is a method and apparatus for detecting the failures of one or more particular antennas in an array antenna.

Another object of the present invention is to provide a method for quantifying siting or antenna balance efficiency.

Another object of the present invention is to create a method for monitoring possible failures of one or more particular antennas in an array antenna, the monitoring requiring very little processing overhead.

Another object of the invention is to provide a monitor that can report on the health of particular antennas in antenna arrays without having to take the receiver or transceiver off-line for maintenance.

Briefly, antenna monitor embodiments of the present invention collect statistics about the received signal strengths of each antenna in a cooperating array over long periods of time. In cellular telephone base station applications, samples of the received signal strength are taken whenever an active mobile subscriber is operating in the area. Periodically, such samples are averaged and added to a running total that is maintained in an accumulator for each antenna. The accumulated totals are then compared after a statistically sufficient number of samples have been collected and averaged. Broken antennas, or ones with bad connections, will be revealed by those corresponding signal paths having low accumulated totals. Given long enough collection periods, the spatial diversity of the antennas in the array will have only a minimal impact on favoring one antenna over another, so that truly faulty antennas will be detected rather than those that have low signal because of their spatial location relative to other antennas in the array.

An advantage of the present invention is that an antenna monitor is provided that detects broken antennas, or ones with bad connections, or ones that are badly sited.

Another advantage of the present invention is that an antenna monitor is provided that can work with a multiple antenna system with any type of antenna and with any type of receivers.

Yet another advantage of the present invention is that an antenna monitor is provided that works continuously and does not require a wireless system to be shutdown for antenna maintenance.

Yet another advantage of the present invention is that an antenna monitor is provided that requires very little processing overhead so is easy to implement in existing systems.

BRIEF DESCRIPTION OF THE DRAWINGS

The present invention will be more fully understood from the detailed preferred embodiments of the invention, which, however, should not be taken to limit the invention to any specific embodiment but are for explanation and better understanding only. The embodiments in turn are explained with the aid of the following figures.

DETAILED DESCRIPTION OF THE PREFERRED EMBODIMENTS

Figure 1:
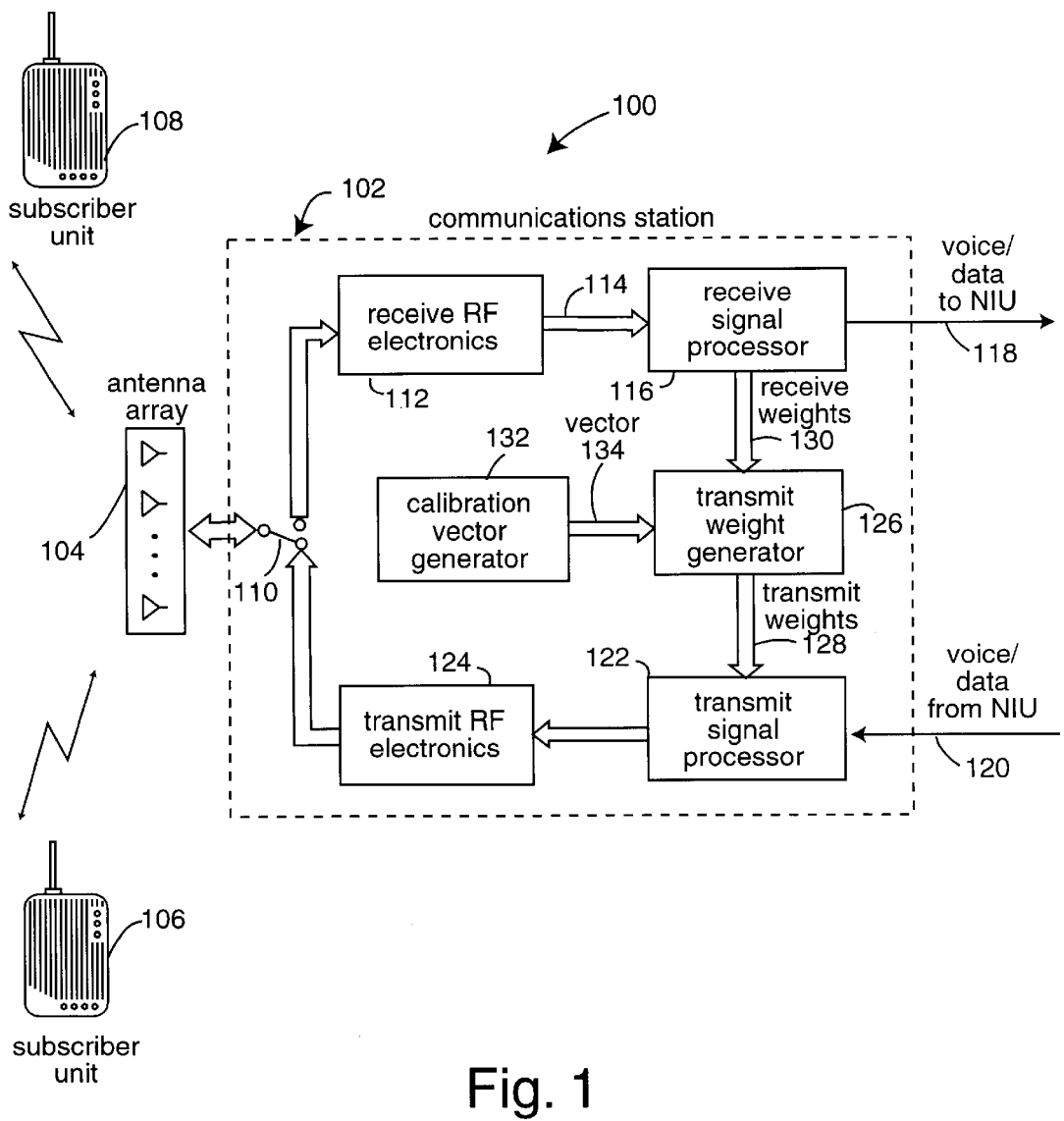
FIG. 1 is a functional block diagram of a multi-antenna transceiver system that may include an antenna performance monitor of the present invention.

The first one or two digits in a reference numeral indicate on which figure that reference numeral is first introduced. For example, reference numerals between 100 and 199 are first introduced in FIG. 1, those between 200 and 299 are first introduced in FIG. 2, and so forth.

The embodiments of the present invention are preferably implemented in wireless communication systems that include communication stations (e.g., cellular base stations) that have an array of antenna elements together with adaptive smart antenna processing. For example, FIG. 1 shows a communication system 100 which includes a base station 102 with a multi-element antenna array 104 that issues time slot commands for mobile subscriber units 106, 108 to respond to it in an orderly manner. In one implementation, the communication system 100 operates using the personal handy phone (PHS) communications protocol which is popular in Japan. The mobile subscriber units 106,108 may be mobile or fixed. A mobile or WLL system may be analog or digital, and may use frequency division multiple access (FDMA), code division multiple access (CDMA), or time division multiple access (TDMA) techniques, the latter usually in combination with FDMA (TDMA/FDMA). Barratt et al., describe a PHS FDMA/TDMA base station having four antenna elements, in above-mentioned U.S. patent application Ser. No. 08/729,390, filed Oct. 11, 1996, incorporated herein by reference. A PHS FDMA/TDMA base station for a wireless local loop (WLL) system that may have any number of antenna elements is described by Yun in U.S. patent application Ser. No. 09/020,049, filed Feb. 6, 1998, incorporated herein by reference.

While the preferred embodiment describes a system that includes adaptive smart antenna processing, this invention is applicable to any communication receiver that uses more than one antenna element to achieve spatial diversity in reception.

FIG. 1 represents a typical two-way communications system 100, for example a cell in a cellular system that includes a communications station (e.g., a base station) 102, and communication system 100 has a remote-to-communications-station uplink, and a communications-station-to-remote downlink. Communications station 102 includes an antenna array 104 which includes several discrete antenna elements each associated with a transmitter of a set of transmitters 124, a receiver of a set of receivers 112, and a signal processor 116 that coordinates the received signals or signals to be transmitted to take advantage of the spatial diversity of the antennas. Communications station 102 supports full-duplex radio communication with subscriber units, and two such remote units 106 and 108 are shown. In a preferred embodiment, communications station 102 uses only a single array of antenna elements for both receive and transmit. In such case, a receive/transmit (T/R) switch 110 is used. In a system that uses frequency-domain duplexing (FDD), meaning a different frequency for the uplink and downlink, T/R switch 110 is a frequency duplexer. For time-domain duplexing (TDD) in which a different time slot is used for the uplink and the downlink to communicate with the same remote unit, an electrical switch can be used.

Uplink signals from the subscriber units (e.g., 106, 108) and possibly from interfering co-channel users are received at each element of the antenna array 104, and individually pass through T/R switch 110 in a "receive position" to set of receivers 112. Each antenna element in the antenna array 104 has a receiver in set 112 associated with it. Each receiver of set of receivers 112 down-converts the radio-frequency (RF) signal from its corresponding antenna element to baseband, so that set of receivers 112 forms a corresponding set of baseband received signals 114. In the preferred embodiment, each receiver in receiver set 112 is of conventional design and includes analog RF components, analog downconversion components, an analog to digital converter, and digital downconverter components to produce one of the digital baseband antenna signals 114, and these baseband received antenna signals are processed by receive signal processor 116 to generate a received signal from a particular subscriber, e.g., from remote unit 106 or 108. In the preferred embodiment, the receive signal processor 116 does the signal demodulation and the spatial processing. The spatial processing uses the fact there are multiple antenna elements with spatial diversity to its advantage. Specifically, the receive signal processor 116 determines a weighted sum of complex in-phase (I) and quadrature (Q) antenna signals, according to a set of complex valued receive weights designed to achieve a maximum signal-to-noise ratio (SNR), a maximum carrier-to-interference ratio, or some other criterion. Such weights can be combined to a vector of complex-valued receive weights. Output 118 is the voice and/or data decoded by receive signal processor 116 and is coupled to a telephone network interface unit (NIU).

On the downlink side, communications-station-to-remote, communications station 102 receives data 120 representing voice and/or data from the NIU. The signal is modulated by a transmit signal processor 122 and the result weighted according to a set of complex-valued weights to generate a set of weighted modulated baseband signals. The weights of each copy are according to a transmit-weight vector of complex valued transmit weights. In the preferred embodiment, such a vector is computed by a transmit-weight generator 126 from the set of received-signal weights derived by receive signal processor 116 for the particular remote user being transmitted to. Each weighted transmit baseband signal is fed to one of set of transmitters 124 to generate an independent RF transmit signal for each corresponding element of antenna array 104 through T/R switch 110 in the "transmit position".

Various conventional methods are known for determining the receive and transmit weights. See for example, above-cited U.S. Pat. Nos. 5,515,378, and 5,592,490, and above-cited U.S. patent application Ser. No. 08/729,390, as well as co-owned U.S. patent application Ser. No. 08/948,772 to Parish, et al. (filed Oct. 10, 1997). In general, the weights are chosen so that the antenna array receives or radiates most of the energy from or towards a particular subscriber unit, e.g., "beam-forming", and/or it receives or transmits minimal energy from or toward co-channel interferers, e.g., "null-placing." One method of determining transmit weights, for example, is to compute the set of transmit weights 128 directly from the set of receive weights 130 generated by receive signal processor 116 for the particular remote user, the computation carried out by transmit weight generator 126 in real time. In such a case, during this computation, transmit weight generator 126 must take into account the gain and phase differences between the uplink and downlink propagation signal paths where the signal paths include both the air-path from and to a subscriber unit and the variation among the different signal parts within the receive RF electronics and also within the transmit RF electronics. This information is stored in calibration vector generator unit 132 in the form of a calibration vector 134.

Figure 2:
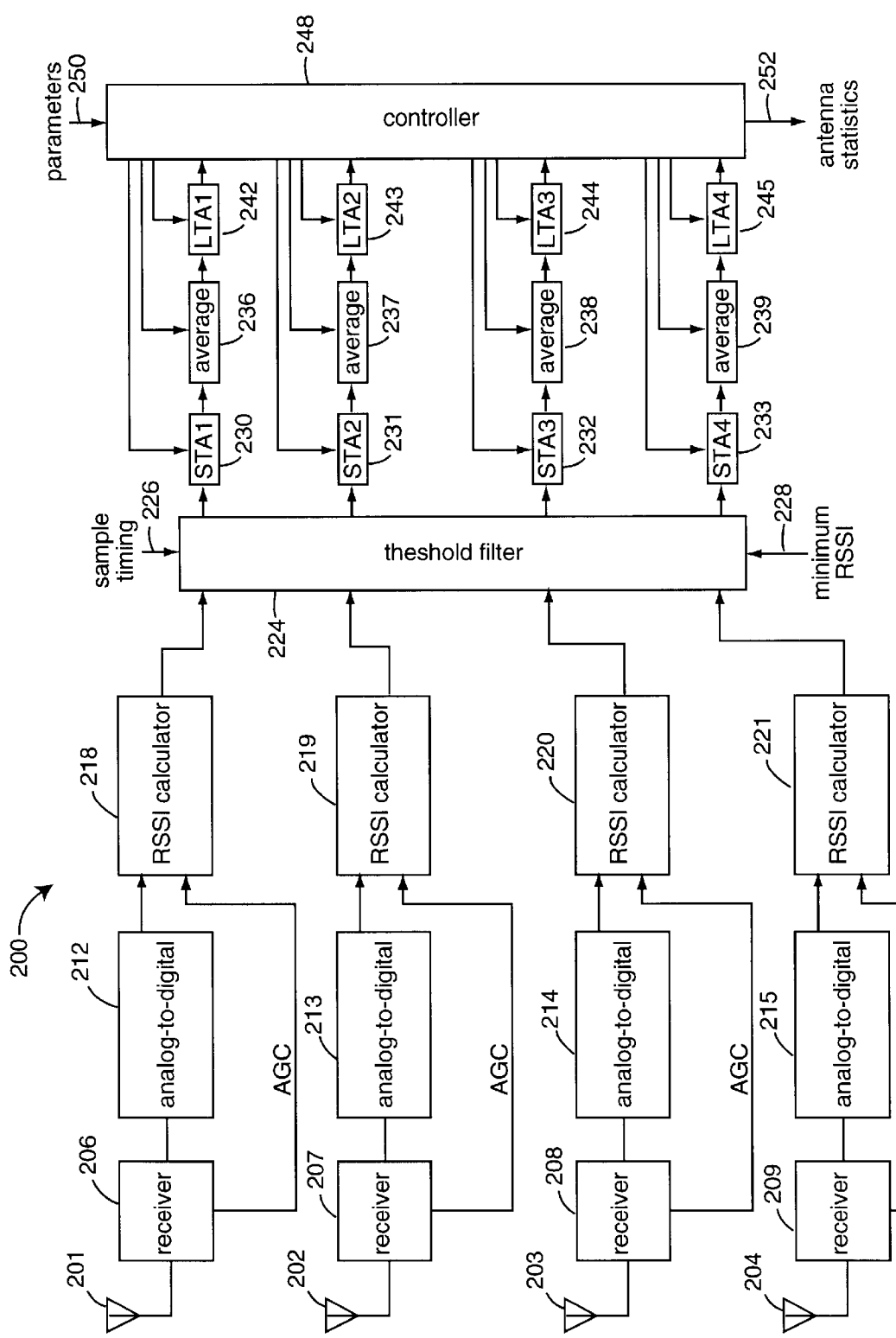
FIG. 2 is functional block diagram of a multi-antenna receiver system antenna performance monitor of the present invention.

In FIG. 2, a set of receivers 200 is connected to an antenna array having four antenna elements 201–204. Note that while FIG. 2 shows a receiving system that uses four antennas, this invention is applicable to a receiver with any number of antennas. The transmitter part and T/R switch part as shown in FIG. 1 are not included in FIG. 2 in. order to simplify the following description. Set of receivers 200 is similar to the front-end parts of set 112 described for the communications station 102 in FIG. 1. Each of the four antenna elements 201–204 is independently associated with a corresponding receiver 206–209, a corresponding analog-to-digital conversion stage 212–215, and a corresponding received signal strength (RSSI) calculator 218–221. The analog-to-digital conversion stages 212–215 are generally included, for example, in set of receivers 112 (FIG. 1). Also not shown here are any digital downconversion stages that may exist after the analog to digital conversion. The configuration shown here is used as part of base station operating in a PHS wireless telephone system, but many other kinds of systems with antenna arrays could also benefit from the present invention. To determine the state of the antenna elements, one or more active mobile transmitters (subscriber units) are assumed to be operating in the vicinity. A threshold filter 224 determines if any RSSI value output by the RSSI calculators 218–221 at a time determined by a sample timing input 226 exceeds a minimum RSSI value input 228. In cellular telephone base station applications for example, samples of the received signal strength are taken whenever an active mobile subscriber is operating in the area. If any one RSSI value output by the RSSI calculators 218–221 does exceed such minimum, then all four of the respective RSSI sample measurements are passed on to the corresponding one of a set of corresponding short term accumulators (STAs) 230–233 for accumulating short term totals.

In one aspect of the invention, the goal is to determine a measure of the average signal strength received by each antenna A long term average is preferred, and because of hardware limitations, in preferred embodiments, two stage averaging is used, e.g., short term averages are first obtained, and these are accumulated by a second accumulator to obtain a long term average (LTA). Given an accumulator with a sufficient number of bits, other implementations can go directly to a long term average. The number of bits needed for accumulation, and hence the number of counting stages or storage cells within each accumulator is dependent on the receiver design, its application, and the frequency in which active mobile units operate within range. Far fewer or many more stages of accumulator and averaging are possible and all such variations fall within the scope of the present invention. Also, while the average is used as an indication in the preferred embodiment, other measures that are indicative of the average may alternately be used.

In some embodiments of the present invention, it may be preferable to convert the magnitudes of the RSSI sample measurements into a log-scale, e.g., into a decibel (dB scale). This can help reduce dynamic range in the results and to eliminate spurious results and interpretations that would occur from wide variations in the measurements if linear measurements were used directly. The RSSI-samples, in log scale, are then accumulated and averaged as described below. The conversion to log (decibel) scale need not be highly accurate, especially if such accuracy were to impose a heavy computational load. A simple-to-calculate transformation is preferred that will approximate a linear-to-log conversion. Note also that while RSSI values are accumulated in this embodiment, this is because RSSI indication is common in cellular and other wireless receivers, so no additional hardware would need to be designed to obtain such measures. This provides for the monitoring with very little processing overhead. Of course, any other indication of signal strength may alternately be used and using such other indication of signal strength is within the scope of the present invention.

STAs 230–233 preferably are able to accumulate at least $2^L$ eight-bit binary RSSI-values, where L is an integer. L=15 in the preferred embodiment. When about $2^{15}$ RSSI-values are accumulated, a corresponding set of averagers 236–239 determines the average RSSI-value associated with each antenna element 201–204 over the last $2^{15}$ samples. A simple way to do this is to have STAs 230–233 each add-in every new RSSI-value until $2^{15}$ samples are accumulated from the threshold filter 224 to form a running total, and then shift the grand total fifteen-bit positions (L positions in the general case of $2^L$ samples) toward the least significant bit to effectuate a binary divide by $2^{15}$.

Each short-term-average RSSI-value in a parallel set of four are thereafter forwarded to a corresponding one of a set of long-term accumulators (LTAs) 242–245.

Such LTAs 242–245 preferably are able to store at least $2^{15}$ such short-term average RSSI-values. Note that in the preferred embodiment, the averaging operation of the values in the STAs may conveniently be combined with the adding to the LTAs by adding a 15-bit-position shifted version of the accumulated values to the LTAs. A controller 248 coordinates STAs 230–233, averagers 236–239, and LTAs 242–245. A parameters input 250 allows the functioning of each of STAs 230–233, averagers 236–239, and LTAs 242–245 to be programmable. An antenna statistics output 252 allows individual data-points and totals running within the STAs 230–233, the averagers 236–239, and the LTAs 242–245, to be inspected and decisions as to the state of the antennas made.

After a sufficient number of RSSI-samples have been obtained and averaged as indicated by a particular number of short term averages accumulated in LTAs 242–245, it may be evident from a relatively low RSSI average from LTAs 242–245 that one or more of the receiver signal paths has a broken or disconnected or otherwise faulty antenna of antennas 201–204. Given long enough collection periods, the spatial diversity of the antennas in the array will have only a minimal impact on favoring one antenna over another.

In alternative embodiments of the present invention, the maximum RSSI-sample values experienced during each short-term accumulation period ($2^{15}$ sample) is recorded and tracked along with the running averages. It can happen that the peculiar spatial diversity of one antenna 201–204 has relegated it to a short-term of obtaining low RSSI-values. It might not be broken or malfunctioning at all. This would be indicated by RSSI-averages that were low compared to the other signal paths, but RSSI-maximums that were on a par with those other signal paths.

Figure 3:
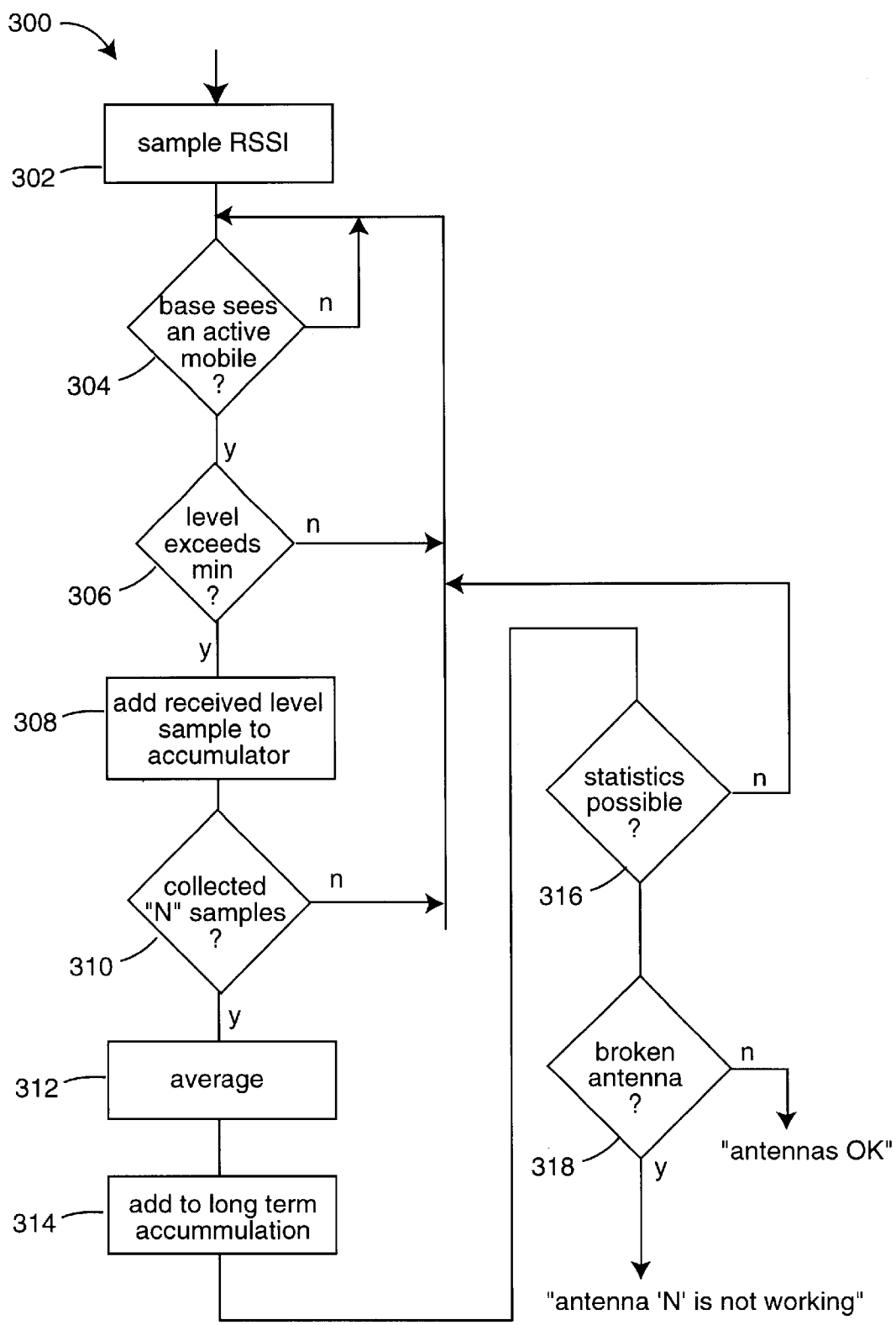
FIG. 3 is a flowchart of a process embodiment of the present invention in which the antenna performance monitor of FIG. 1 is used to collect statistics that are used to identify any non-performing individual antennas in the antenna array.

In an illustration of one embodiment of the method of the invention, FIG. 3 shows a method 300 for independently monitoring the operational condition of antennas and their connections in arrays of antennas, wherein a receiver produces a received signal strength indication (RSSI) of a single remote transmitter for each of a plurality of receivers respectively connected to each of a plurality of antennas in an antenna array. The method 300 comprises a sampling step 302 where an RSSI value is sampled, the RSSI value respectively associated with each of the plurality of antennas in the antenna array. A step 304 decides if there is an active remote transmitter operating within range. According to the established protocols for the PHS system, the remote subscriber units that are assigned time-slots by the base station report-in during expected periods that can be measured for signal strength. In a step 306, it is determined whether any of a plurality of antennas in the array are seeing a minimum value signal strength. If so, a step 308 collects "M" number of parallel samples of the RSSI values, one from each receiver, where M is the number of antennas. A step 310 checks to see if a certain number "N", for example $2^{15}$ such samples have been collected. A step 312 periodically averages the RSSI values accumulated whenever N samples (N=$2^{15}$) have been accumulated. A step 314 adds these to a long-term accumulator. At some point determined by the parameters loaded into input 250 (FIG. 2), there will be sufficient data collected in the long term accumulators to make some decision of the operating health of the antennas. A step 316 asks if such sufficient data has been accumulated. If not, more data is accumulated. If so, a step 318 asks the question is any antenna not functioning. Again, the parameters needed to decide this can come from the parameters loaded into input 250 (FIG. 2). If an antenna is broken, not functioning, or otherwise faulty, a message to that effect can be annunciated. Otherwise a message stating the antennas are OK can be issued. In addition, other statistical analyses can be used to determine of the siting is efficient. Distinguishing between a faulty antenna due to some hardware problem and a faulty antenna due to inefficient siting can be determined, for example, by tracking long term data (looking at the history). If the antenna is faulty because of some broken component, then at some time in the past, it was not so, while if the siting is faulty, then the antenna would appear "faulty" over the whole history of its siting.

The decision as to whether any antenna is faulty or broken is made in general by comparing the averaged results of all antennas. With sufficient spatial sampling, the mean signal levels from all antennas should be about the same. So the method is to compare the long term average values. A broken antenna is reported if any of the antennas have LTA levels that are more that a certain number of dB (X dB) below that of the maximum LTA value for any antenna. Other heuristics that determine if the signals received by any one antenna are out of expected range compared to other antennas also are possible, as would be clear to one of ordinary skill in the art. In the preferred embodiment, a value of 10 dB for X was used for indicating a broken antenna. Other values would be used for indicating siting problems Note that although the relative signal strengths (as indicated by comparing LTA RSSI values) are used for faulty antenna determination, the actual signal levels for any antenna element, as indicated by the LTS RSSI value, can be very useful in determining siting efficiency of the whole base station and for network analysis.

The statistics (number of samples accumulated) required for faulty antenna detection or siting analysis are a function of the environment in which the system will be deployed. For example, in a fixed location cellular system, e.g., a wireless local loop (WLL) system, a lot more statistics need to be accumulated than in a mobile environment. In a mobile environment, fading provides some averaging to equalize the power at the antennas, and such fading does not occur in a stationary environment. The numbers used herein assume a mobile environment, and modifying this for a fixed (e.g., WLL) environment would be straightforward to one of ordinary skill in the art. Alternatively, in order to avoid biasing by dominant users, only a maximum numbers of samples from any one user is accumulated.

Preferably the sampling of the receiver signal strength described is such that no sampling occurs until a remote transmitter is operating within range of the antenna array. Otherwise, a measurement of the background noise only would lead to spurious results. In the preferred embodiment, only samples from remote users that are actually connected to the base station are sampled. That is, samples from other users not connected to the base station are not taken. In an alternate embodiment, all samples, including those from users that are connected to other base stations are samples. Also in the preferred embodiment, only signals that have a minimum RSSI value are sampled, the minimum predetermined to provide for a healthy margin over noise. Also, because the heuristic preferably used for broken antenna determination is to look for an antenna that has an average RSSI that is at least X dB, it is desirable to only log RSSI values that are at least X dB above the noise floor.

Referring again to FIG. 2, some receivers, including those in the preferred embodiment, use automatic gain control (AGC). The AGC values in such a case are used in RSSI calculators 218–221, which require such scaling information.

In the receivers illustrated here in this description, it is preferred that the sampling of RSSI values occurs for a set of samples near a middle part of a burst of data for any time-slot. Because remote transmitters operating within range have a power up ramp and possibly a ramp-down at the start and end of data bursts, sampling near the center of a burst will avoid false readings in the burst ramp-up and ramp-down periods. So in preferred embodiments, a sampler detects when a middle part of a signal burst from a received signal occurs, and outputs a corresponding received-signal-level measures unaffected by a ramping up or a ramping down of the signal burst. The averaging step 312 can be such that about $2^{15}$ RSSI values are collected and then averaged by having added each RSSI value as a binary value to a running total and then shifting bit positions to effectuate a division of the running total. The sampling can be such that the magnitude of each RSSI value obtained is converted to a log-scale.

While the present invention has been described in terms of RSSI values, alternate implementations may use other signal strength or signal quality measures. Thus the term signal quality measure refers to any signal strength or signal quality measure, including RSSI and log-RSSI. See for example, above referenced and incorporated herein by reference U.S. patent application Ser. No. 09/020,049 to Yun for one alternate signal quality generator. Using a measure that already is available, such as RSSI which commonly already is determined in receivers, enabled the monitoring to occur with very little computational overhead.

Also, although the present invention has been described in terms of an average of signal quality measures, other statistics may be used. For example, the maximum over the period of time may be used, with any antenna whose maximum value is relatively low indicating fault.

Therefore, although the present invention has been described in terms of the presently preferred embodiments, it is to be understood that the disclosure is not to be interpreted as limiting. The present invention is useful in all communication systems in which more than one antenna is used by a single receiver or transceiver, e.g., for spatial diversity. Various alterations and modifications will no doubt become apparent to those of ordinary skill in the art after having read the above disclosure. Accordingly, it is intended that the appended claims be interpreted as covering all alterations and modifications as fall within the true spirit and scope of the invention.

What is claimed is:

1. A method for monitoring an antenna array, comprising:
   periodically sampling a quality of a signal received at each of the plurality of antennas;
   maintaining a value indicating the quality of the signal received at each of the plurality of antennas over a period of multiple samples;
   generating an indication for a given antenna in the array of antennas that the given antenna is faulty or poorly situated if the maintained value indicating the quality of the signal received for the given antenna indicates the quality is poor relative to the values indicating the quality of the signal received by other of the plurality of antennas.

2. The method of claim 1, wherein sampling the quality of the signal received comprises sampling the strength of the signal received.

3. The method of claim 2, wherein sampling the strength of the signal received comprises sampling a measure of the strength of the signal received.

4. The method of claim 3, wherein sampling a measure of the strength of the signal received comprises sampling a received signal strength indication of the strength of the signal received.

5. The method of claim 3, wherein sampling a measure of the strength of the signal received comprises sampling a measure of the strength of the signal received when the measure of the strength of the signal received exceeds a minimum threshold.

6. The method of claim 1, wherein sampling the quality of the signal received comprises sampling the quality of the signal received only when a subscriber unit is transmitting within receiving range of the antenna array.

7. The method of claim 1, wherein maintaining a value indicating the quality of the signal received at each of the plurality of antennas over a period of multiple samples comprising maintaining an value indicating the average received signal strength of the signal received at each of the plurality of antennas over a period of multiple samples.

8. The method of claim 1, wherein maintaining a value indicating the quality of the signal received at each of the plurality of antennas over a period of multiple samples comprises:
   collecting a number of samples of the quality of the signal received at each of the plurality of antennas over the period; and
   calculating for each of the plurality of antennas a value indicating an average of the number of samples collected.

9. The method of claim 1, wherein maintaining a value indicating the quality of the signal received at each of the plurality of antennas over a period of multiple samples comprises:
   collecting a number of samples of the quality of the signal received at each of the plurality of antennas over the period;
   calculating for each of the plurality of antennas a value indicating an short term average of the number of samples collected; and
   accumulating the value indicating a short term average over repeated periods of multiple samples to form a long term average associated with each antenna.

10. A apparatus that monitors an antenna array, comprising:
    a plurality of antennas;
    a plurality of receivers each coupled to a respective one of the plurality of antennas to receive a signal therefrom;
    a sampling circuit coupled to the receivers to periodically sample a quality of a signal received at each of the receivers from the respective ones of the plurality of antennas;
    a memory coupled to the sampling circuit, the memory providing for storage of a value indicating the quality of the signal received at each of the plurality of antennas over a period of multiple samples;
    a comparator coupled to the memory to compare the quality of the signal received for each of the plurality of antennas;
    an output coupled to the comparator to provide an indication for a given antenna in the array of antennas that the given antenna is faulty or poorly situated if the comparator determines the value stored in memory indicates that the quality of the signal received for the given antenna is poor relative to the values indicating the quality of the signal received by other of the plurality of antennas.

11. An apparatus that monitors an antenna array, comprising:
    means for periodically sampling a quality of a signal received at each of the plurality of antennas;
    means for maintaining a value indicating the quality of the signal received at each of the plurality of antennas over a period of multiple samples;
    means for generating an indication for a given antenna in the array of antennas that the given antenna is faulty or poorly situated if the maintained value indicating the quality of the signal received for the given antenna indicates the quality is poor relative to the values indicating the quality of the signal received by other of the plurality of antennas.

12. An article of manufacture, comprising:
    a machine accessible medium, the machine accessible medium providing instructions, that when executed by a machine, cause the machine to:
    periodically sample a quality of a signal received at each of the plurality of antennas;
    maintain a value indicating the quality of the signal received at each of the plurality of antennas over a period of multiple samples;
    generate an indication for a given antenna in the array of antennas that the given antenna is faulty or poorly situated if the maintained value indicating the quality of the signal received for the given antenna indicates the quality is poor relative to the values indicating the quality of the signal received by other of the plurality of antennas.

13. The article of manufacture of claim 12, wherein the machine readable medium providing instructions that when executed by the machine cause the machine to sample the quality of the signal received cause the machine to sample the strength of the signal received.

14. The article of manufacture of claim 13, wherein the machine readable medium providing instructions that when executed by the machine cause the machine to sample the strength of the signal received cause the machine to sample a measure of the strength of the signal received.

15. The article of manufacture of claim 14, wherein the machine readable medium providing instructions that when executed by the machine cause the machine to sample a measure of the strength of the signal received cause the machine to sample a received signal strength indication of the strength of the signal received.

16. The article of manufacture of claim 14, wherein the machine readable medium providing instructions that when executed by the machine cause the machine to sample a measure of the strength of the signal received cause the machine to sample a measure of the strength of the signal received when the measure of the strength of the signal received exceeds a minimum threshold.

17. The article of manufacture of claim 12, wherein the machine readable medium providing instructions that when executed by the machine cause the machine to sample the quality of the signal received cause the machine to sample the quality of the signal received only when a subscriber unit is tansmitting within receiving range of the antenna array.

18. The article of manufacture of claim 12, wherein the machine readable medium providing instructions that when executed by the machine cause the machine to maintain a value indicating the quality of the signal received at each of the plurality of antennas over a period of multiple samples cause the machine to maintain an value indicating the average received signal strength of the signal received at each of the plurality of antennas over a period of multiple samples.

19. The article of manufacture of claim 12, wherein the machine readable medium providing instructions that when executed by the machine cause the machine to maintain a value indicating the quality of the signal received at each of the plurality of antennas over a period of multiple samples cause the machine to:

collect a number of samples of the quality of the signal received at each of the plurality of antennas over the period; and calculate for each of the plurality of antennas a value indicating an average of the number of samples collected.

\* \* \* \* \*